United States Patent

[11] 3,614,212

| [72] | Inventor | Fromund Hock |
| | | Wetzlar, Germany |
| [21] | Appl. No. | 842,849 |
| [22] | Filed | July 18, 1969 |
| [45] | Patented | Oct. 19, 1971 |
| [73] | Assignee | Ernst Leitz GmbH |
| | | Wetzlar, Germany |
| [32] | Priority | Aug. 1, 1968 |
| [33] | | Germany |
| [31] | | P 17 73 965.0 |

[54] OSCILLATING LIGHT BEAM GENERATING DEVICE
5 Claims, 3 Drawing Figs.

[52] U.S. Cl. .................................................. 350/285,
250/235, 250/237, 356/167, 356/170
[51] Int. Cl. ......................................................... G02f 1/34,
G01b 11/04
[50] Field of Search ........................................... 356/167,
152, 170; 250/235, 237; 350/285, 6, 99

[56] References Cited
UNITED STATES PATENTS

| 1,787,647 | 1/1931 | Sollie | 350/285 |
| 1,859,243 | 5/1932 | Owens | 350/285 |

*Primary Examiner*—Ronald L. Wibert
*Assistant Examiner*—J. Rothenberg
*Attorney*—Krafft & Wells

ABSTRACT: In a photoelectric position-determining apparatus a device for generating an oscillating light beam is disclosed. The device comprises a light source, a diaphragm, oscillating optical elements, and a driving mechanism therefor. The diaphragm is mounted in a stationary position and the optical elements, which may be prisms or double mirrors, are arranged behind the diaphragm in the direction of the light flux. The first optical element oscillates in a plane which is parallel to the plane of the diaphragm and almost perpendicular to the direction of the impinging light. As a consequence of this arrangement the light beam oscillates with an amplitude double the width of the oscillation amplitude of the mechanical driving mechanism.

A second optical element is disposed in a lateral offset manner with respect to the first optical element and oscillates in the parallel plane so that the directions of oscillation of the first and second optical elements are positioned at an angle with respect to each other.

PATENTED OCT 19 1971          3,614,212

INVENTOR
BY FROMUND HOCK
Krafft + Wells

OSCILLATING LIGHT BEAM GENERATING DEVICE

CROSS-REFERENCE TO RELATED APPLICATIONS

Applicant claims priority under 35 U.S.C. 119 for application P 17 73 965.0 filed Aug. 1, 1968 in the Patent Office of the Federal Republic of Germany. The copending application of Hock Ser. No. 541,645 filed Apr. 11, 1966 is referred to herein.

BACKGROUND OF THE INVENTION

The present invention pertains to a device for generating an oscillating light beam by moving an optical element to influence the direction of light flux of the light beam, for example in an apparatus for photoelectrically determining positions.

To those skilled in this particular art of length measuring and position determining it is well known that such apparatus consists of a graduated scale in rigid connection with the object to be measured, a light source by means of which a light beam is directed towards the graduated scale and a photoelectric sensing means upon which the light beam impinges after having transmitted through the scale or being reflected therefrom, depending on the particular embodiment of the apparatus used. The marks constituting the scale graduation are usually opaque or nonreflecting respectively so that light will impinge on the photoelectric sensing means only between such scale marks.

As is also well known, measurement (or positioning) is performed by laterally displacing the scale together with the object. During displacement the light travelling to the photosensitive means is interrupted whenever a scale mark wanders through the light path, while the light impinging on the photoelectric receiver between two adjacent scale marks causes an electric pulse to be generated therein. The pulses are conducted to an electromagnetic counter and the length of the object may be determined simply by multiplying the number of counted pulses with the known distance of the scale marks.

Such apparatus, however, does not account for that fraction of object length which exceeds the last full scale interval. In order to evaluate this fraction it is known in the art to make the light beam oscillating and to include the generating device of the oscillating motion in a proportionally working position control system. The latter impresses a "shift" current on the circuit of the generating device as a result of which the zero point of the oscillating motion is shifted in the direction of the last passed graduation mark on the scale. The shift current is always proportional to the distance between the original position of the center-zero point and its position after it has been shifted to the graduation mark. Thus, the shift current provides a measure for the above-mentioned fraction of object length which exceeds the last full scale interval.

Such a device is, for example, described in the German periodical "Feingeraetetechnik," Volume 8, 1961, page 357. At the bottom of page 363 and on page 364 are listed a number of further publications on this subject matter which list also includes various English language publications to which reference is hereby expressly made. The device described in "Feingeraetetechnik" includes a beam of light rays transmitted through an objective. The light beam is periodically deflected by an oscillating plane parallel glass plate of which the axis of oscillation is parallel to the planar glass surface.

It is a disadvantage, however, that the cross section of the glass plate must be relatively large and must correspond to the cross section of the light beam. Further, the optical reduction ratio caused by the plane parallel glass plate influences the required masses, the scanning frequency and the center-zero stability in an unfavorable sense.

A device wherein these disadvantages are avoided is disclosed in my copending patent application Ser. No. 541,645. Here the optical deflecting element and the diaphragm are rigidly connected and are set in an oscillating motion by a mechanical drive means. The light is guided to the optical deflecting element in the direction of the oscillating motion by means of a condenser. Caused by the oscillating motion the image of the lamp filament is moved in the direction of the axis of the diaphragm, as a consequence whereof the illuminated diaphragm emits an oscillating light beam of constant intensity which is conducted to the objective and the graduated scale. The oscillation amplitude of the light beam emitting from the diaphragm corresponds to the oscillation amplitude of the mechanical drive means.

The present invention has as its object the improvement of the device disclosed in my above-cited copending application. It is a particular object to double the oscillation amplitude with regard to the amplitude of the mechanical drive means, and it is another object to make scanning and measurement possible in the direction of two coordinates as compared to the one coordinate in which measurement is only possible with the above-described apparatus.

SUMMARY OF THE INVENTION

The above stated objects are attained by mounting the diaphragm stationarily in front of a light source with oscillating deflecting optical elements, such as prisms or double mirrors, behind the diaphragm in the direction of light travel.

A first optical deflection means is arranged behind the diaphragm in such a manner that it can oscillate approximately perpendicularly to the light beam emanating from the diaphragm and in parallel to the plane of the diaphragm. A second optical deflection means may be disposed in a laterally offset manner with respect to the first optical means and oscillates in a parallel plane so that the directions of oscillation of the first and second optical means are positioned at an angle with respect to each other.

Scanning in the direction of two coordinates becomes possible if, as is further suggested, the diaphragm is provided with two crossed slits and the second oscillating prism is arranged in the direction of light travel behind the first one and turned thereto, preferably by 90°, and if the directions of oscillation of the two prisms are made to coincide with the directions in which the two crossed diaphragm slits extend.

DESCRIPTION OF THE DRAWINGS

The invention will be more readily comprehended from the following description when taken in conjunction with the appending drawings, wherein.

DESCRIPTION OF THE PREFERRED EMBODIMENTS

Figure 1:
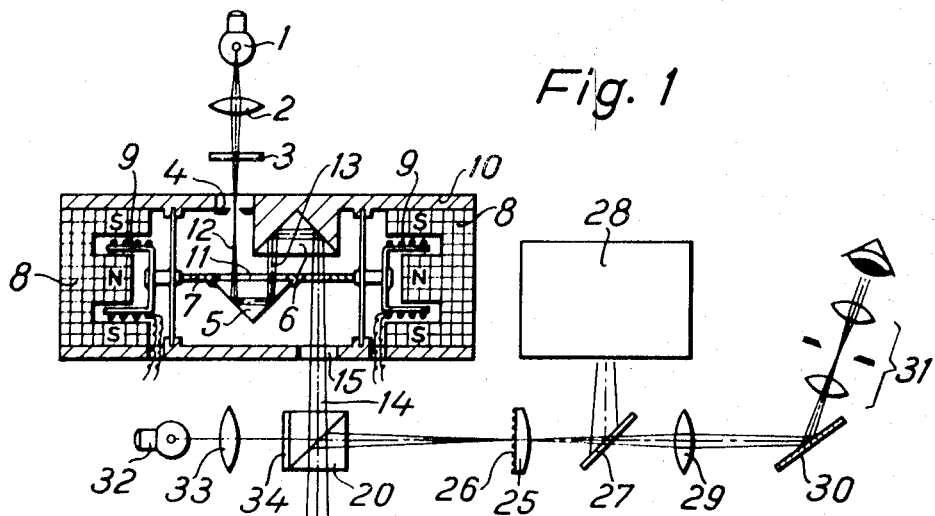
FIG. 1 shows a device for photoelectrically scanning a graduated scale.

Referring now to the drawings it will be seen that a lamp 1 illuminates a slit diaphragm 4 through a condenser 2 and a color filter 3. The beam of light rays 12 transmitted by the slit of diaphragm 4 impinges almost perpendicularly on the hypotenuse face 11 of an elastically suspended 90° roof prism 5. In order to separate undesired reflexes from the main light beam portion the direction of incidence of the light on the hypotenuse face should preferably differ 2° to 4° from the exact normal direction.

After traversing roof prism 5 the light rays travel to a further 90° roof prism 6. Roof prism 5 is mounted on a carrier 7 which is elastically suspended and is connected to the coils 9 of two moving coil magnet systems 8. The elements 4 through 9 are housed in a casing 10.

When the coils 9 in the magnetic systems 8 are energized with an alternating current, roof prism 5 will oscillate in the direction of its hypotenuse face 11 and perpendicular to the direction of its roof edge. This oscillating motion will be performed in the manner of sinusoidal cycles. When roof prism 5 is displaced by a distance 's' the beam of light 13 emerging from prism 5 will be laterally displaced by a distance 2s. Roof prism 6 serves for directing the oscillating light beam 13, now denoted 14, to an aperture 15 in the wall of casing 10.

The oscillating light beam 14 travels to a beam splitter 20 and from there to an objective diaphragm 22 and further to an objective 23 and a graduated scale 24. On the surface of this scale oscillates the image 4' of the diaphragm 4 with a constant light intensity. From this illuminated spot on the scale the light is reflected through the beam splitter 20 to a field lens 25, and from there the light travels further through a second beam splitter 27 to a photomultiplier 28. The AC component of the output current obtained from multiplier 28 is evaluated by means of a special evaluation device (not shown) in the sense of photoelectrically sensing the position of a graduation mark. However, the graduated scale 24 may also be visually observed by means of the objective 23 with an ocular 31 and the help of a field lens 29, a reflecting mirror 30 and the beam splitter 20.

The marks on the graduated scale 24 which are to be sensed may be of widely varying nature. They may be absorbing lines on a reflecting or transparent carrier, however, they may also be groovelike marks on a reflecting carrier or reflecting marks on a transparent or absorbing carrier. Further, objects in the nature of wires, wire networks, coils, windings, and crests of threads can be sensed photoelectrically.

In order to determine possible tilting, the objective 23 is replaced by a telescope objective, and the graduated scale 24 is replaced by a plane mirror without graduation thereon. Any tilting of the plane mirror relative to the impinging light beam 14 can be read from a second grating 26 arranged on field lens 25. Grating 26 can be illuminated by a lamp 32 through a condenser 33 and a filter 34. The latter transmits preferably light which has no effect on photomultiplier 28.

Lateral displacement may be determined by substituting a micro objective and a spherical mirror for objective 23 and graduation scale 24. The center of the spherical mirror must be disposed in the image plane of the objective. If displacement is only to be determined in one coordinate a cylindrical mirror may be used instead of the spherical mirror with the cylinder axis extending in parallel to the direction of the slit image.

The light source, i.e. lamp 1, may also include fiber optics and a pentaprism or a double mirror (56) may be employed instead of the roof prisms 5 and 6.

Figure 2:
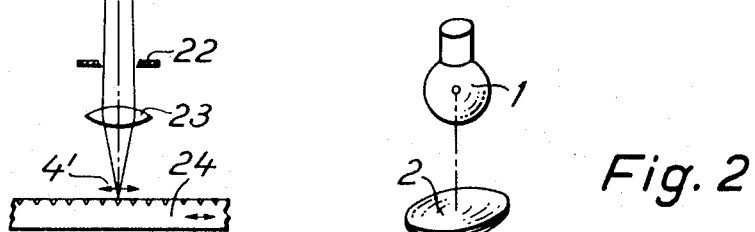
FIG. 2 shows partially a device for photoelectrically scanning a graduated scale in the direction of two coordinates.
Figure 3:
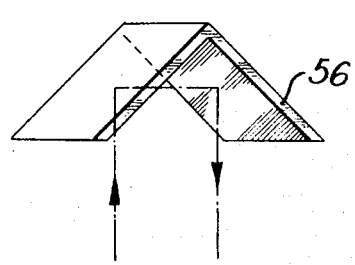
FIG. 3 shows a double mirror which may be substituted for the roof prisms.

In FIG. 2, it is shown how the oscillation of the light beam toward two coordinate directions is obtained, wherein the slit diaphragm is fashioned as a crossed slit 44. The second roof prism arranged offset with respect to the roof prism 5, denoted herein by 46, is rotated by 90° with respect to the roof prism 5 and oscillates, as the latter, in the direction of its hypotenuse face and at right angles to its roof edge, as shown by the arrows indicated therein. The hypotenuse faces of both prisms 5 and 46 face each other and extend in parallel to one another. Prism 46 is mounted in the same manner as prism 5 and the oscillating motion is imparted to the prism by a similar moving coil magnet system as has already been described with reference to FIG. 1. Both magnet systems in FIG. 2 are schematically symbolized by the boxes 40 and 41. Preferably, the frequencies of the oscillating motions of the two prisms 5 and 46 are made different so that the scanning in the two coordinate directions can easily be distinguished by an electronic evaluation device.

If the moving coil system is incorporated in a proportionally functioning position control system and for a preestablished ratio that the driven mass (i.e. prism plus suspending elements) bears to the maximal possible driving force the frequency of the oscillating motion depends only on the mechanical resiliency of the system. Such a proportionally functioning position control system is attained by the control of a shift current which is conducted through the moving coils besides the alternating current which excites the oscillating motion. The shift current mentioned above causes a displacement of the center of oscillation of the prisms 5 and 46 in such a way that the position-defining discriminator signal obtained from the photoelectric multiplier 28 is as small as possible. The shift current and the lateral displacement are proportional and, consequently, when automatically balanced, the shift current impressed by the control system represents a measure of the position of the graduation mark relative to the center of oscillation. This measurement is independent of the variations and the level of the discriminator signal and is used for determining the position of the scanned graduation mark 24.

In the invented device the amplitude of the oscillating beams of light 13 and 14 is double the amplitude of the oscillating motion of the elements 5, 7, 9. As a result, the measuring range on the graduated scale 24 and on grating 26 may be doubled or, if the measuring range remains unchanged, the frequency of the scanning motion may be doubled, thereby achieving a doubling of interference distance relative to interference accelerations. Besides, the invented device makes it possible to scan crossmarkings etc. in two coordinates with different frequencies without requiring oscillating slits or diaphragms being arranged in conjugated planes in front of the crossmarkings.

What is claimed is:

1. In a photoelectric position-determining apparatus, an oscillating light-beam-generating device comprising in combination;

a light source (1) having a direction of light flux, a stationarily arranged slit diaphragm positioned to intersect said direction of light flux (4), an optical deflection means (5) behind said diaphragm in said direction of light flux, said means oscillating in a plane which is parallel to the plane of the diaphragm and perpendicular to said direction of the impinging light flux, said optical deflection means being a 90° roof prism upon the hypotenuse face of which said direction of light flux is approximately perpendicularly incident and which oscillates in parallel to said hypotenuse face in a direction normal to the roof edge, and a moving coil magnet system (8) whereto said optical deflection means is firmly connected and said system having coils (9) through which an alternating current is conducted.

2. In a photoelectric position-determining apparatus, a device for generating an oscillating light beam comprising in combination;

a light source (1) having a direction of light flux (12), a stationarily arranged slit diaphragm (4,44) positioned to intersect said direction of light flux, first optical deflection means (5) arranged behind said diaphragm in said direction of light flux, said deflection means oscillating approximately in a plane perpendicular to said direction of light flux and parallel to the plane of said diaphragm, second optical deflection means (6,46) into which said light flux passes after exiting from said first optical means (5) and which is disposed in a laterally offset manner with respect to said first optical means and which oscillates in a plane parallel to the plane of said diaphragm, the directions of oscillation of said first and second optical means (5,6,46) are positioned at an angle with respect to each other, and electromagnetic drive means through which an alternating current is conducted, connected to said first and second optical deflection means (5,6,46).

3. An apparatus according to claim 2, wherein said diaphragm (4,44) is provided with two angularly related slits, the longitudinal directions of which coincide with the directions of oscillation of said first and second optical deflection means (5,6,46).

4. An apparatus according to claim 2, wherein said first and second optical deflection means (5,6,46) are first and second roof prisms with a roof angle of 90° having hypotenuse faces which are facing toward each other and which oscillate in the direction of these faces as well as at right angles to the roof edges thereof, said roof prisms arranged so that said light flux emanating from said diaphragm (4,44) impinges almost perpendicularly into the hypotenuse face of said first prism and passes, from there, likewise approximately perpendicular into the hypotenuse face of said second prism.

5. An apparatus according to claim 2, wherein at least one of the said optical deflection means is an angular mirror composed of two mirrors with a roof angle of 90°.